US011924355B2

(12) United States Patent
Cohen et al.

(10) Patent No.: US 11,924,355 B2
(45) Date of Patent: Mar. 5, 2024

(54) METHODS FOR GRINDING-RESISTANT CONSENSUS IN A PROOF-OF-SPACE-BASED BLOCKCHAIN

(71) Applicant: Chia Network Inc., San Francisco, CA (US)

(72) Inventors: Bram Cohen, San Francisco, CA (US); Krzysztof Pietrzak, Vienna (AT); Mariano Sorgente, Tokyo (JP)

(73) Assignee: Chia Network Inc., San Francisco, CA (US)

( * ) Notice: Subject to any disclaimer, the term of this patent is extended or adjusted under 35 U.S.C. 154(b) by 322 days.

(21) Appl. No.: 17/497,699

(22) Filed: Oct. 8, 2021

(65) Prior Publication Data

US 2022/0116225 A1 Apr. 14, 2022

Related U.S. Application Data

(60) Provisional application No. 63/150,573, filed on Feb. 17, 2021, provisional application No. 63/089,492, filed on Oct. 8, 2020.

(51) Int. Cl.
*H04L 9/32* (2006.01)
*H04L 9/00* (2022.01)

(52) U.S. Cl.
CPC .......... *H04L 9/3247* (2013.01); *H04L 9/3236* (2013.01); *H04L 9/3271* (2013.01); *H04L 9/50* (2022.05)

(58) Field of Classification Search
CPC ... H04L 9/3247; H04L 9/3236; H04L 9/3271; H04L 9/50; H04L 63/12
See application file for complete search history.

(56) References Cited

U.S. PATENT DOCUMENTS

| 10,887,107 | B1* | 1/2021 | Chan ................. H04L 9/3271 |
| 11,392,955 | B2* | 7/2022 | Thomas ............ G06Q 20/0855 |
| 2016/0253622 | A1 | 9/2016 | Sriram et al. |
| 2016/0283920 | A1* | 9/2016 | Fisher ................. H04L 9/3239 |
| 2016/0292672 | A1 | 10/2016 | Fay et al. |

(Continued)

OTHER PUBLICATIONS

Nguyen, Cong T., et al. "Proof-of-stake consensus mechanisms for future blockchain networks: fundamentals, applications and opportunities." IEEE access 7 (2019): 85727-85745. (Year: 2019).*

(Continued)

*Primary Examiner* — Jung W Kim
*Assistant Examiner* — Sameera Wickramasuriya
(74) *Attorney, Agent, or Firm* — Run8 Patent Group, LLC; Peter Miller; Brian T. Chew

(57) ABSTRACT

A method for extending a blockchain includes, at a space server in a distributed network: storing a plot file. The method also includes accessing a blockchain: during a current slot in the series of slots, accessing a proof-of-space challenge based on a current slot challenge associated with the current slot and a challenge chain signage point; in response to accessing the proof-of-space challenge, retrieving a proof-of-space based on the proof-of-space challenge and the plot file; calculating a quality-based number of iterations based on the quality of the proof-of-space; generating a block comprising the proof-of-space, the challenge chain signage point, and a reward chain signage point; and broadcasting the block to the distributed network.

20 Claims, 5 Drawing Sheets

(56) References Cited

U.S. PATENT DOCUMENTS

| | | | |
|---|---|---|---|
| 2017/0005804 | A1 | 1/2017 | Zinder |
| 2017/0337534 | A1 | 11/2017 | Goeringer et al. |
| 2017/0364700 | A1 | 12/2017 | Goldfarb et al. |
| 2018/0174122 | A1* | 6/2018 | Mattingly ............ H04L 9/3239 |
| 2018/0336552 | A1* | 11/2018 | Bohli ................... H04L 9/3297 |
| 2019/0044734 | A1* | 2/2019 | Lancashire ........... H04L 9/3239 |
| 2019/0081793 | A1* | 3/2019 | Martino ................ H04L 9/0894 |
| 2019/0303622 | A1 | 10/2019 | Versteeg et al. |
| 2019/0325115 | A1* | 10/2019 | Wilkinson ........... G06Q 20/085 |
| 2019/0349185 | A1 | 11/2019 | Kim et al. |
| 2020/0313859 | A1* | 10/2020 | Ateniese ............... H04L 9/0637 |

OTHER PUBLICATIONS

Abasulah et al., "Beyond Hellman's Time-Memory Trade-Offs with Applications to Proofs of Space" (2017) https://eprint.iacr.org/2017/893.pdf.

Bernstein, D.J., "The ChaCha family of stream ciphers" (2008) https://cr.yp.to/chacha.html.

Boneh et al.,, "Verifiable Delay Functions," In Hovav Shacham and Alexandra Boldyreva, Editors, CRYPTO 2018, Part I, vol. 10991 of LNCS, pp. 757{ 788. Springer, Heidelberg, Aug. 2018 (32 ?ages).

Boneh et al., "A Survey of Two Verifiable Delay Functions," Cryptology ePrint Archive, Report 2018/712, J018. https://eprinl.iacr.org/2018/712 (13 pages).

Cohen et al., "Simple Proofs of Sequential Work. "Simple proofs of sequential work. In Jesper Buus Nielsen and Vincent Rijmen, editors, EU-ROCRYPT 2018, Part II, vol. 10821 of LNCS, pp. 451{467. Springer, Heidelberg, Apr. / May 2018(60 pages).

Dziembowski et al., "Proofs of Space," In Rosario Gennaro and Matthew J_ B. Robshaw, editors, CRYPTO 2015, Part II, vol. 9216 of LNCS, pp. 585{605. Springer, Heidelberg, Aug. 2015 (21 pages).

Eyal et al., "Majority is not Enough: Bitcoin Mining is Vulnerable," In Nicolas Christin and Reihaneh Safavi-Naini, editors, FC 2014, vol. 8437 of LNCS, pp. 436{454. Springer, Heidelberg, Mar. 2014 (18 pages).

Garay et al., "The Bitcoin Backbone Protocol with Chains of Variable Difficulty," In Jonathan Katz and Hovav Shacham, editors, CRYPTO 2017, Part I, vol. 10401 of LNCS, pp. 291{323. Springer, Heidelberg, Aug. 2017 (30 pages).

Garay et al., "The Bitcoin Backbone Protocol: Analysis and Applications," In Elisabeth Oswald and Marc Fischlin, editors, EUROCRYPT 2015, Part II, vol. 9057 of LNCS, pp. 281{310. Springer, Heidelberg, Apr. 2015 (47 pages).

Kumar, Amil, "MIT: Crypto puzzle solved 15 years too early," Apr. 30, 2019 https://www.revyuh.com/lop-news/rending/mit-crypto-puzzle-solved-15-years-loo-early/ (3 pages).

Long et al., "Binary quadratic forms," 2018 https://github.com/Chia-Nelwork/vdf-competition/blob/master/classgroups.pdf (28 pages).

Notice of Allowance received in U.S. Appl. No. 15/931,463 dated Aug. 10, 2021.

Oeschlin, Philippe, "Making a Faster Cryptanalytic Time-Memory Trade-Of" (2003) https://lasec.epfl.ch/pub/lasec/doc/Oech03.pdf.

Park et al., "SpaceMint: A Cryptocurrency Based on Proofs of Space," Cryptology ePrint Archive, Report 2015/528, J015. http://eprinl.iacr.org/2015/528 (29 pages).

Pietrzak, Krzysztof, "Simple Verifiable Delay Functions," Cryptology ePrint Archive, Report 2018/627, 2018. hllps://eprinl.iacr.org/2018/627 (20 pages).

Simisker, Mart, "A review of "Asymmetric Numeral Systems"", (2017) https://courses.cs.ut.ee/MTAT.07.022/2017_fall/uploads/Main/mart-report-f17.pdf.

Wesolowski, Benjamin, "Efficient verifiable delay function," Cryptology ePrint Archive, Report 2018/623, 2018. https://eprinl.iacr.org/2018/623 (29 pages).

* cited by examiner

METHODS FOR GRINDING-RESISTANT CONSENSUS IN A PROOF-OF-SPACE-BASED BLOCKCHAIN

CROSS-REFERENCE TO RELATED APPLICATIONS

This Application claims the benefit of U.S. Provisional Application No. 63/150,573, filed on 17 Feb. 2021, and U.S. Provisional Application No. 63/089,492, filed on 8 Oct. 2020, each of which is incorporated in its entirety by this reference.

This Application is related to U.S. patent application Ser. No. 17/320,114, filed on 13 May 2021, which is a continuation-in-part application of U.S. patent application Ser. No. 15/931,463, filed on 13 May 2020, which claims the benefit of U.S. Provisional Application 62/850,221, filed on 20 May 2019, each of which is incorporated in its entirety by this reference.

TECHNICAL FIELD

This invention relates generally to the field of cryptographic blockchains and more specifically to new and useful methods for grinding-resistant consensus in proof-of-space-based or proof-of-stake-based Nakamoto-type blockchains in the field of cryptographic blockchains.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Space Server Method

Figure 1:
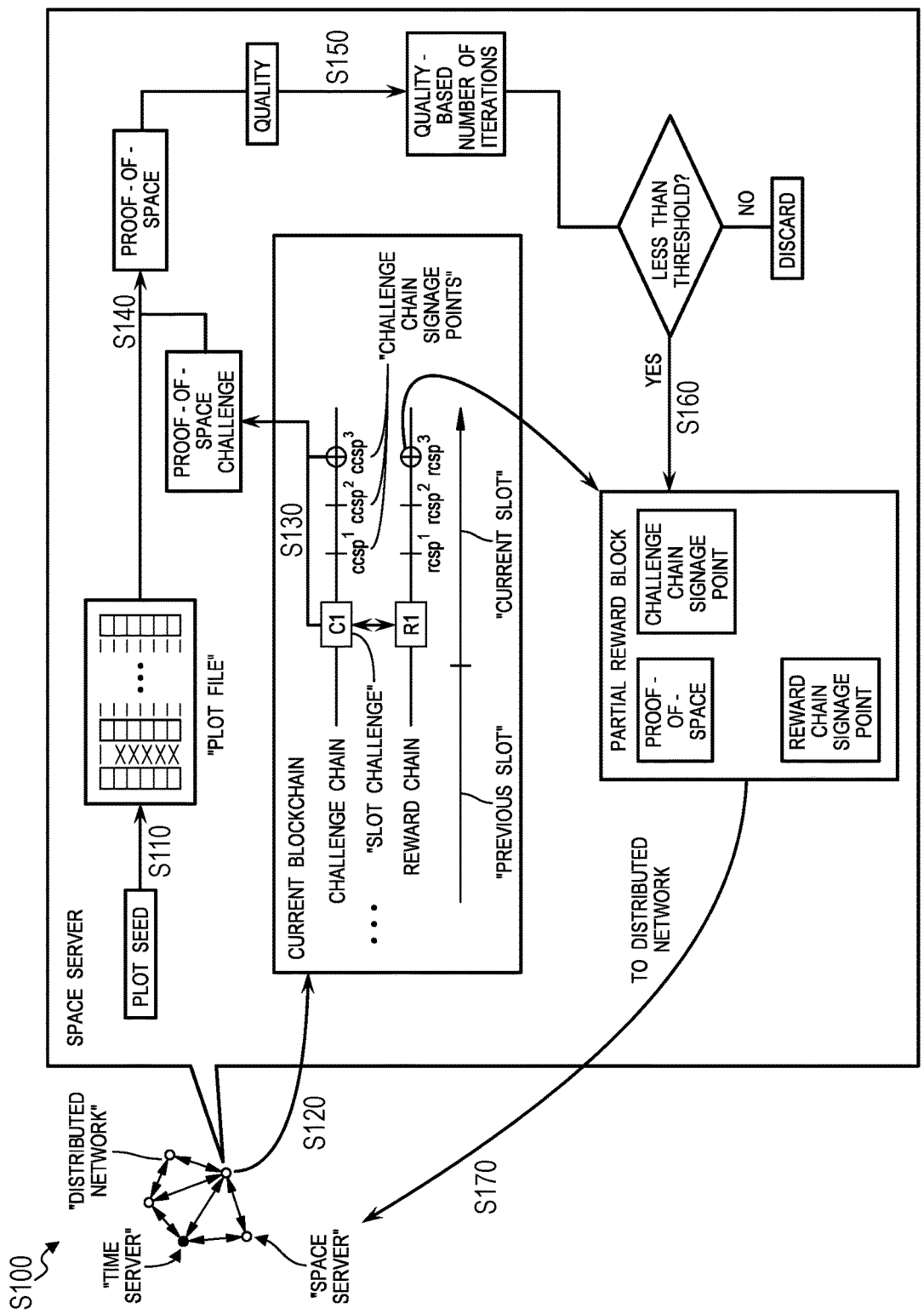
FIG. 1 is a flowchart representation of a first method.

As shown in FIG. 1, a method S100 for extending a blockchain includes, at a space server in a distributed network: storing a plot file in Step S110. The method Sioo also includes, in Step S120, accessing a blockchain defining a series of slots, each slot in the series of slots: associated with a slot challenge; including a challenge chain based on the slot challenge and including a series of challenge chain signage points; and including a reward chain based on the slot challenge, including a series of reward chain signage points, and comprising a series of blocks, each block in the series of blocks responsive to a proof-of-space challenge based on the slot challenge, a challenge chain signage point, and a reward chain signage point. The method S100 additionally includes: during a current slot in the series of slots, accessing a first proof-of-space challenge based on a current slot challenge associated with the current slot and a first challenge chain signage point in a current series of challenge chain signage points of the current slot in Step S130; in response to accessing the first proof-of-space challenge, retrieving a first proof-of-space based on the first proof-of-space challenge and the plot file, the first proof-of-space characterized by a first quality in Step S140; calculating a first quality-based number of iterations based on the first quality in Step S150; in response to a threshold number of iterations exceeding the first quality-based number of iterations, generating a first block comprising the first proof-of-space, the first challenge chain signage point, and a first reward chain signage point in a current series of reward chain signage points of the current slot, the first reward chain signage point concurrent with the first challenge chain signage point in Step S160; and broadcasting the block to the distributed network in Step S170.

One variation of the method Sioo for generating proofs-of-space and updating a blockchain over a network includes storing a plot file based on a plot seed. This variation of the method S100 also includes accessing a blockchain, the blockchain: including a challenge chain including a series of challenge blocks, and a reward chain including a series reward blocks, the series of challenge blocks being a subset of the series of reward blocks; and defining a series of slots, each slot including a challenge block in the series of challenge blocks, and including a subset of reward blocks in the series of reward blocks, each reward block in the subset of reward blocks responsive to a proof-of-space challenge based on the challenge block and responsive to a VDF input based on the challenge block. Additionally, this variation of the method Sioo includes accessing the blockchain, wherein an earliest reward block in the subset of reward blocks of each slot in the series of slots defines a challenge block of a subsequent slot. The method Sioo additionally includes: at a time during a slot, receiving a current challenge based on a most recent challenge block in the challenge chain; in response to receiving the current challenge, retrieving a proof-of-space based on the current challenge and the plot file, the proof-of-space characterized by a quality; calculating a quality-based number of verifiable delay function iterations based on the quality; and, in response to a current slot length of the current slot exceeding the quality-based number of verifiable delay function iterations, broadcasting the proof-of-space to the network. The method S100 further includes, in response to receiving a signage point based on execution of a verifiable delay function for the number of iterations: cryptographically signing the signage point to generate a signed signage point based on the proof-of-space; generating a block including the signed signage point, the proof-of-space, and a hash of a most recent block in a reward chain; and broadcasting the block to the network.

2. Time Server Method

Figure 2:
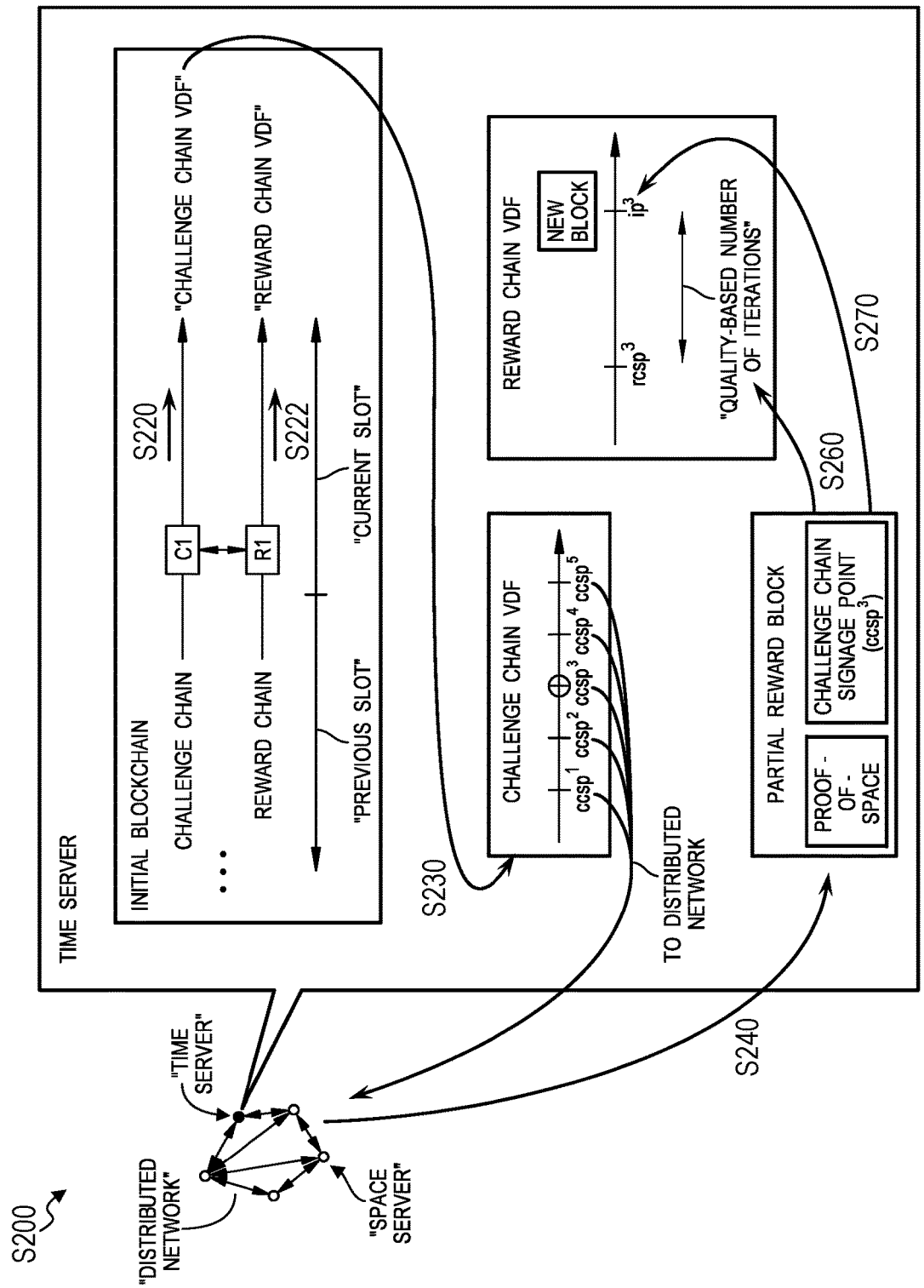
FIG. 2 is a flowchart representation of a second method.

As shown in FIG. 2, a method S200 for extending a blockchain over a network includes, at a space server in a distributed network, in Step S210, accessing a blockchain, the blockchain, defining a series of slots, each slot in the series of slots: associated with a slot challenge; including a challenge chain based on the slot challenge and including a series of challenge chain signage points; including a reward chain based on the slot challenge and including a series of reward chain signage points; and including a series of blocks, each block in the series of blocks responsive to a proof-of-space challenge based on the slot challenge, a challenge chain signage point, and a reward chain signage point. The method S200 also includes, at a beginning of a current slot: initiating a challenge chain verifiable delay function for the challenge chain based on a current slot challenge associated with the current slot in Step S220; and initiating a reward chain verifiable delay function for the reward chain based on the current slot challenge in Step S222. The method S200 additionally includes: on a current signage point interval during the current slot, broadcasting a current series of challenge chain signage points by executing the challenge chain verifiable delay function and a current series of reward chain signage points by executing the reward chain verifiable delay function in Step S23o; receiving, from the distributed network, a first block including a first proof-of-space based on the current slot challenge and a first challenge chain signage point in the current series of challenge chain signage points, the proof-of-space characterized by a first quality in Step S240; calculating a first quality-based number of iterations based on the first quality in Step S250; and executing the reward chain verifiable delay function for a first number of infusion iterations based on the first quality-based number of iterations in Step S260. The method S200 further includes, in response to executing the reward chain verifiable delay function for the first number of infusion iterations: appending a first reward chain infusion point to the first block, the first reward chain infusion point based on the output of the reward chain verifiable delay function at the first number of infusion iterations in Step S270; and infusing the first block into the reward chain verifiable delay function to extend the blockchain in Step S280.

One variation of the method S200 for generating proof-of-time and extending a blockchain over a network includes accessing a blockchain in Step S210, the blockchain: including a challenge chain including a series of challenge blocks, and a reward chain including a series of reward blocks, the series of challenge blocks being a subset of the series of reward blocks; and defining a series of slots, each slot including a challenge block in the series of challenge blocks, and including a subset of reward blocks in the series of reward blocks, each reward block in the subset of reward blocks responsive to a proof-of-space challenge based on the challenge block and responsive to a VDF input based on the challenge block. Additionally, this variation of the method S200 includes accessing the blockchain, wherein an earliest reward block in the subset of reward blocks of each slot in the series of slots defines a challenge block of a subsequent slot. This variation of the method S200 also includes: at a time coinciding with a beginning of a slot, initiating a verifiable delay function based on a most recent block of a challenge chain in Step S220; receiving, from the network, a proof-of-space based on the most recent block of the challenge chain, the proof-of-space characterized by a quality corresponding to a quality-based number of verifiable delay function iterations in Step S230; broadcasting to the network a signage point based on an output of the verifiable delay function while executing the quality-based number of verifiable delay function iterations; receiving a signed block including a signed signage point based on the signage point, the proof-of-space, and a hash of a most recent block in a reward chain; executing a number of infusion verifiable delay function iterations succeeding the quality-based number of verifiable delay function iterations, the infusion verifiable delay function iterations based on the quality-based number of verifiable delay function iterations in Step S260; and, in response to executing the infusion quality-based number of verifiable delay function iterations prior to termination of the slot and in response to verifying the signed block, infusing the signed block into the verifiable delay function based on a second output of the verifiable delay function after executing the number of infusion verifiable delay function iterations to generate a new block in the reward chain in Step S280.

3. Applications

Generally, the method Sioo and the method S200 are executed by nodes (e.g., computational devices) in a distributed network (e.g., connected over the internet) in order to extend a permissionless and secure blockchain including a proof-of-space and a proof-of-time within each block of the blockchain. The blockchain generated via execution of the methods S100 and S200 is secure assuming no party controls a sufficiently large fraction of the total space of the distributed network and assuming no party can execute proofs-of-time significantly faster than other parties in the distributed network. More specifically, by executing the methods S100 and S200, nodes in the distributed network can extend a blockchain that includes: two canonical chains, a challenge chain and a reward chain (the blocks of each chain including a proof-of-space, a proof-of-time, and a cryptographic signature); and a data chain, which can include transactions or any other data to be represented in the blockchain and which are cryptographically linked (e.g., via signatures or hashes of signatures) to blocks of the reward chain. Thus, the distributed network can generate a blockchain that exhibits the desirable security and decentralization characteristics of proof-of-work-based blockchains while utilizing far less energy by leveraging proofs-of-space and proofs-of-time. Additionally, by separating the data chain from the challenge chain via an intermediate reward chain, the distributed network can provide resistance to grinding attacks, to which other proof-of-space based blockchains are vulnerable.

The method S100 and the method S200 are two parts of a consensus algorithm that, when executed by nodes in the distributed network, operate in tandem to infuse blocks to the blockchain, thereby enabling decentralized verification of information (e.g., transactions) in association with these blocks. A node in the distributed network executing the method Sioo (hereinafter "a space server") is competing to generate a proof-of-space for a new block in the blockchain, while a node in the distributed network executing the method S200 (hereinafter a "time server") is competing to generate a proof-of-time for the new block in the block chain. Thus, by executing the method Sioo and S200 concurrently, at least one space server in interaction with at least one time server can: generate a proof-of-space and a proof-of-time respectively; combine these proofs into a valid block via cryptographic signatures and hashes; and infuse (or append) this block to the blockchain. Additionally, nodes (e.g., space servers) that contribute to the creation of a new and valid block can include a reward for themselves in a data block associated with the new block, thereby incentivizing further participation in the consensus algorithm.

In some implementations, a time server in the distributed network executes Steps of the method S200 to: execute an ongoing verifiable delay function (hereinafter "VDF") computation; and occasionally infuse new blocks (including proofs-of-space) into this ongoing VDF computation. Meanwhile, a spacer server in the distributed network executes Steps of the method S100 to generate new blocks, including a proof-of-space allocated on the space server, for infusion into the ongoing VDF computation being executed at the time server. Thus, in these implementations, time servers and space servers in the distributed network cooperate to infuse blocks into the network in a predominately sequential manner. However, in some instances, due to communication delay of new blocks over the distributed network, some blocks may not refer to the immediately prior block but instead to earlier blocks in order to avoid orphaning blocks infused into the blockchain.

Generally, space servers generate a proof-of-space that is responsive to a challenge posed according to a most recent block in the challenge chain of the blockchain. A "challenge", as referred to herein, describes a number that is some function (e.g., a hash) of a prior block within the blockchain. More specifically, space servers can: store a plot file on disk; receive a challenge based on the most recent block in the block chain; retrieve a proof-of-space (i.e., a series of tuples from the plot file) that confirms the presence of the plot file on disk and is responsive to the challenge; and calculate a quality of the proof-of-space. The space servers, therefore, compete against all the space servers in the distributed network to retrieve a high-quality proof-of-space (i.e., higher than a threshold quality) in order to win the ability to add a block to the blockchain. The space servers execute a proof-of-space algorithm that exhibits a property such that the probability of achieving a high-quality proof-of-space is directly proportional to the amount of space reserved for the plot file on disk, thereby conferring advantages to space servers with larger plot files stored on disk (or a greater number of plot files stored on disk). Thus, via execution of Steps of the method Sioo, space servers compete in a space-based lottery to add blocks to the blockchain based on each space server's share of the total drive space reserved across the distributed network.

Generally, time servers continuously execute iterations of a function that verifies the passage of time such as a VDF. A time server can infuse blocks into an ongoing VDF, which will modify future outputs of the VDF in a manner that is verifiable given the content of the infused block. Additionally, time server executing Steps of the method S200 calculate the timing of block infusion based on a "quality" of the proof-of-space included within each new block such that blocks of a lower quality are infused into the blockchain after a longer delay than blocks of a higher quality. More specifically, time servers can: receive a block including proof-of-space from a space server in the distributed network; verify the proof-of-space; execute a quality-based number of VDF iterations; and infuse the new block into the blockchain, after completing the quality-based number of iterations. Infusion incorporates the data of a new block (e.g., based on a hash of the new block) into future iterations of the VDF of the blockchain, thereby modifying future outputs of the VDF function based on the content of the infused block. Thus, time servers in the network execute a quality-based number of VDF cycles as quickly as possible in order to continuously extend the blockchain.

In addition to generating proofs-of-space and proofs-of-time and combining these proofs into new blocks, the space servers and time servers execute blocks of the methods S100 and S200 respectively according to "slots" that define which blocks are infused into the challenge chain, which blocks are infused to the reward chain, when transactions are added to the data chain, and when new challenges are issued to the distributed network. Each slot defines a predetermined slot length measured as a number of VDF iterations selected such that the slot lasts for a target slot duration (e.g., five minutes, ten minutes). Additionally, each slot includes a single slot challenge that affects the proof-of-space challenges to which the space servers respond. During a slot, space servers attempt to retrieve the highest-quality proof-of-space responsive to each proof-of-space challenge issued by the time servers. If the space server retrieves a proof-of-space characterized by a quality corresponding to a number of iterations less than a threshold number of iterations (e.g., the slot length or the signage point interval), then the space server generates a new block including the proof-of-space; and broadcasts the new block to the distributed network. A time server can then: receive the new block; and infuse the new block into the ongoing VDF computation at a position calculated based on the quality of the proof-of-space within the new block. However, if the space server retrieves a proof-of-space characterized by a quality-based number of VDF iterations greater than the threshold, then the space server can discard the proof-of-space as it will not be infused into the blockchain by a time server.

Upon expiration of a slot, the earliest reward block infused into the reward chain within the previous slot is infused into the challenge chain as the basis for the slot challenge of a subsequent slot. Therefore, the remaining reward blocks act to "bury" this earliest reward block in order to thwart withholding attacks and other grinding attacks. In addition to winning the ability to create a subsequent challenge block, the winning space server (i.e., the space server that retrieves the earliest proof-of-space during the slot) can also generate and sign a data block for infusion into the data chain that includes transactions, thereby completing consensus for new data added to the blockchain.

The consensus algorithm, as described herein, includes references to a single space server and a single time server. However, due to the nature of a distributed blockchain network, Steps of the method S100 and Steps of the method S200 can be executed concurrently by multiple space servers and by multiple time servers in competition to generate new blocks of the blockchain. Additionally, the distributed network can operate as a peer-to-peer network and, therefore, data—such as versions of the blockchain, challenge blocks, reward blocks, data blocks, challenges, signatures, and/or hashes—can be transferred between nodes in the distributed network directly or via a gossip protocol.

4. Terminology

Generally, Steps of the method Sioo and/or the method S200 may be referred to herein as occurring "concurrently" or being "concurrent with" another Step in the method S100 and/or the method S200. However, in this context, the term "concurrently" or being "concurrent with" indicates an event occurring after the same number of iterations of a VDF function from the beginning of the slot. For example, event A may be referred to as being concurrent with event B if event A and event B both occur after 125473 iterations of a single VDF or multiple VDFs running in parallel, executed by a time server, and having been initiated by the time server at the beginning of a current slot.

Generally, Steps of the method S200 can include "infusion" of a block into a particular sub-chain (i.e., the reward chain, the challenge chain, or the infused challenge chain) of the blockchain. As utilized herein, "infusion" or "infusing" indicates a change in the VDF function of a chain to include data from a block or from a part of a block. Thus, after a time server infuses a block into a blockchain, each subsequent iteration and output of the VDF generated by the timer server is dependent upon and affected by the content of the block.

5. Proof-of-Space

Generally, space servers in the distributed network execute a proof-of-space algorithm to demonstrate that, at a time at which a proof-of-space challenge is posed, the space server is reserving a specified amount of space on disk. More specifically, a space server can: initialize or "plot" a specific amount of space on disk (e.g., 50 gigabytes, one terabyte) in Step S110; and, in response to receiving a proof-of-space challenge (e.g., in the form of a 256-bit value), retrieve a proof-of-space based on the received proof-of-space challenge and the plot file, the proof-of-space characterized by a quality. Further details regarding the plotting algorithm and retrieval of a proof-of-space based on the plot file and the challenge are described in U.S. patent application Ser. No. 17/320,114.

In one implementation, a space server can generate a proof-of-space that includes 64 values extracted from the plot file that are characterized by a prespecified mathematical relationship with each other, as well as with the proof-of-space challenge. Thus, other nodes in the distributed network can easily verify a proof-of-space by checking for these prespecified mathematical relationships between values in the proof-of-space and between the proof-of-space and the proof-of-space challenge. For example, the space server can generate a proof-of-space by retrieving a set of tuples from the plot file that generate an output of "true" when input to a cryptographic matching function.

Additionally, a space server executes a proof-of-space algorithm that requires very little computational time to retrieve (e.g., less than one second) when compared to the amount of computational time required to generate the plot file on disk (e.g., at least eight hours), thereby preventing space servers from generating multiple plots within a short period of time in response to a challenge and selecting the most promising proof-of-space from the newly generated plots. Thus, the proof-of-space algorithm prevents Hellman or time-memory tradeoff attacks.

Upon generating a proof-of-space in response to a challenge, a space server can then calculate a quality of the proof-of-space by executing a quality function on the proof-of-space. For example, the space server can execute a cryptographic hash of the proof-of-space to calculate a quality of the proof-of-space. Once the space server calculates a quality of a proof-of-space, the space server can combine this with a size of the plot file to calculate a quality-based number of iterations in Step S150. The space server calculates a higher number of iterations for lower quality values and for smaller plot file sizes. Thus, the highest quality blocks generated from the largest plots require the shortest amount of time to be incorporated into a block via a time server executing the method S200, thereby increasing the probability that a space server earns a reward for generating the proof-of-space proportionate to the size of the plot file. More specifically, a space server can execute a proof-of-space algorithm that generates proofs-of-space with higher quality proportional to the size of the plot file. In this implementation, the space server calculates the proof-of-space based on the challenge; executes a quality function to calculate a quality of the proof-of-space proportional to the size of the plot file; and calculates a quality-based number of VDF iterations based on the quality of the proof-of-space.

In one implementation, the proof-of-space challenge is calculated based on: a slot challenge, which remains the same for the duration of the slot; a challenge chain signage point, which is broadcasted by a time server on a predetermined signage point interval periodically during a slot, and a plot ID of the plot file. For example, the space server can calculate a proof of space challenge by calculating a cryptographic hash of the slot challenge, a most recent challenge chain signage point, and the plot ID of a plot file stored by the space server. Thus, in this implementation, proofs-of-space are cryptographically tied to the plot from which they were generated, the slot in which they were retrieved, and a particular challenge chain signage point within a slot. By relating proof-of-space challenges to periodic signage points within a slot, the distributed network can increase the frequency of block creation on the blockchain and effect a more predictable rate of block creation on the blockchain (e.g., by preventing clustering of blocks being infused at around the same time within a slot).

6. Proof-of-Time

Generally, time servers in the distributed network execute VDFs in order to cryptographically demonstrate that a specific amount of time has passed since a proof-of-space challenge was issued. A VDF is a function that is inherently sequential to compute, so an adversary cannot speed up its evaluation via increased parallelism. The input to a VDF is typically a tuple (x,T) where x is the input and T is the number of sequential steps (e.g., squarings of a class group). Moreover, the output of a VDF can be efficiently verified by all parties. One implementation of a VDF executed by time servers in the distributed network is further described in U.S. patent application Ser. No. 17/320,114.

A time server can infuse a value (e.g., a hash of a new block) into a VDF computation by accessing an output of the VDF, hashing the output of the VDF with the value to be infused, sampling a new VDF instance based on the hash, continuing the computation of the new VDF instance. Thus, time servers can infuse blocks into the challenge or reward chains at specific positions.

For example, a time server can execute a VDF function that includes a repeated hash, wherein each iteration of the VDF is a hash of the output of the previous iteration. In this example, challenges and new blocks can be infused into a VDF by combining values representing the challenge or the new block with the last output of the VDF function before hashing the resulting combined value and inputting the hash into a subsequent iteration of the VDF. In this manner, time servers can infuse a new block to either the challenge chain or the reward chain by combining hashes of the new block with a latest VDF output of the respective chain into which the new block to be infused.

7. Blockchain Structure

Figure 4:
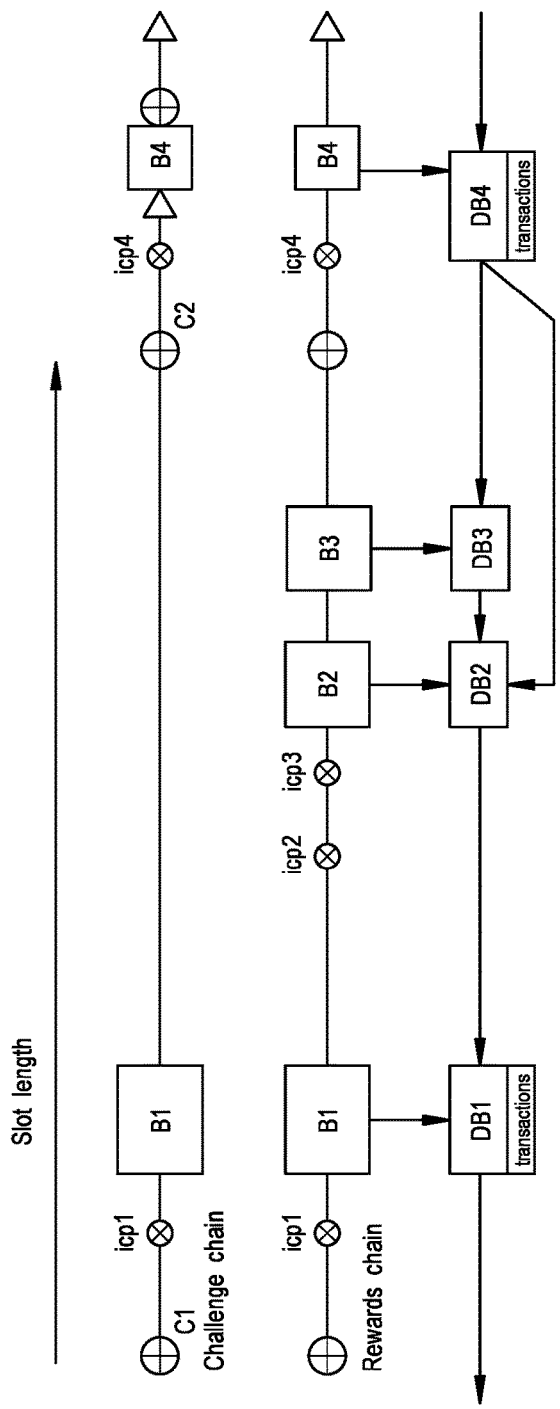
FIG. 4 is a schematic representation of a blockchain data structure.
Figure 5:
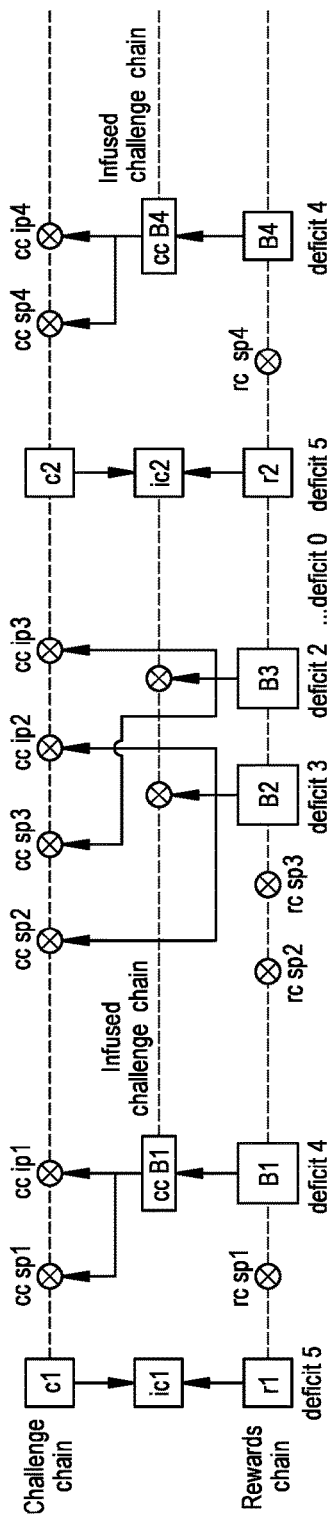
FIG. 5 is a schematic representation of one variation of the blockchain data structure.

As shown in FIGS. 4 and 5, nodes in the distributed network execute the method S100 and the method S200 in order to create blockchain data structure (hereinafter "the blockchain") including a challenge chain, a reward chain, and a data chain. The blockchain is further divided into slots, each of which corresponds to a slot challenge (in FIG. 4, C1 and C2 and, in FIG. 5, ic1 and ic2) and a set of blocks responsive to the slot challenge. For each slot of the blockchain, the reward chain includes a series of reward blocks responsive to the proof-of-space challenge for the slot, the earliest of these reward blocks forms the basis for the slot challenge of a subsequent slot. For each slot of the blockchain, the challenge chain includes a single challenge block based on the earliest reward block of the previous slot. Thus, the challenge chain is linked to the reward chain via the dependency of each challenge block on the earliest reward block of a prior slot.

More specifically, the nodes in the network can access a blockchain: including a reward chain, which includes a series of reward blocks and a challenge chain, which includes a subset of the series of reward blocks (i.e., a series of challenge blocks), wherein each challenge block sets the challenge for a set of subsequent blocks; and defining a series of slots, each slot including a challenge block in the series of challenge blocks and including a subset of reward blocks in the series of reward blocks, each reward block in the subset of reward blocks responsive to a proof-of-space challenge based on the challenge block and responsive to a VDF input based on the challenge block in Steps S120 and S210. Additionally, nodes in the distributed network can access a blockchain such that an earliest reward block in the subset of reward blocks of each slot in the series of slots defines a challenge block (in FIG. 4: B1) of a subsequent slot. Thus, for each slot of the blockchain, the blockchain includes a single challenge block in the challenge chain that defines the challenge for all reward blocks of the slot in the reward chain, and a series of reward blocks in the reward chain that are responsive to the challenge block of the slot. The earliest reward block in the series of reward blocks in a slot then defines the challenge for the next slot.

Alternatively, as shown in FIG. 5, the blockchain data structure can define a series of slots, each slot in the series of slots: associated with a slot challenge; including a challenge chain based on the slot challenge and including a series of challenge chain signage points (in FIG. 5: cc sp1, ccsp2, ccsp3, etc.); including a reward chain based on the slot challenge and including a series of reward chain signage points (in FIG. 5: rc sp1, rc sp2, rc sp3, etc.); and including a series of blocks (in FIG. 5: B1, B2, B3, etc.), each block in the series of blocks responsive to a proof-of-space challenge based on the slot challenge, a challenge chain signage point, and a reward chain signage point. In this implementation, the challenge chain and the reward chain each include a series of signage points that the time server executing the VDF of the challenge chain and the reward chain periodically broadcasts to the distributed network on a predetermined signage point interval measured in VDF iterations. In this implementation, the space server calculates a new proof-of-space challenge based on the slot challenge of the current slot and the most recent challenge chain signage point. Thus, a new proof-of-space challenge is issued to the space servers in the distributed network on a periodic basis during each slot.

Furthermore, as shown in FIG. 4, the blockchain includes a data chain that is cryptographically linked to the reward chain such that each data block (in FIG. 4: DB1, DB2, DB3, etc.) in the data chain includes a signature based on a reward block in the reward chain. Although data blocks in the data chain can include different values, malicious nodes cannot execute a grinding attack on the data chain as the value of future challenge do not depend on any value of the data chain.

In one implementation, the distributed network defines the slot length of each slot (in VDF iterations) such that the slot duration (in seconds) approaches a target slot duration (e.g., five minutes).

In another implementation, the blockchain can include an infused challenge chain that is based on the earliest reward block within a slot and defines a contiguous VDF (e.g., without infusions of subsequent reward blocks) that persists for the remaining duration of the slot. Therefore, the infused challenge chain isolates the content of the earliest reward block (which defines the challenge of the subsequent slot) from the influence of subsequent reward blocks infused into the reward chain. As a result, this implementation of the blockchain is more resilient to attacks based on manipulation of reward blocks later in a slot.

For each of the above-described challenge chains and the reward chain of the blockchain, a time server can execute a separate VDF. For example, in an implementation of the blockchain including a challenge chain and a reward chain, a time server can simultaneously execute a first reward VDF for the reward chain (infusing reward blocks as the reward blocks are generated by the space servers) and execute a second challenge VDF for the challenge chain (infusing a new challenge block at the beginning of each slot, thereby generating the challenge for the subsequent slot). In another example implementation of the blockchain including a challenge chain, an infused challenge chain, and a reward chain, a time server can simultaneously execute a first reward VDF for the reward chain, a second challenge VDF for the challenge chain, and a third infused challenge VDF for the infused challenge chain.

In one implementation, time servers in the distributed network execute a VDF based on class groups of binary quadratic forms. In this implementation, the time server infuses new blocks or other content into a chain by modifying the class group of the VDF. More specifically, the time server can infuse the block in a chain's VDF by hashing the output of the VDF together with the content to be infused (e.g., a new block), sampling a new group based on the hash value, and continuing the VDF computation based on the new group.

7.1 Challenge Chain

Generally, the challenge chain includes a series of challenge blocks, each challenge block being the earliest response to the previous challenge block present within the reward chain. Each challenge block within the challenge chain includes a proof-of-space responsive to a challenge from the previous challenge block (e.g., a hash of the VDF output of the previous challenge block), a VDF output characterized by a quality-based number of VDF iterations less than the slot length and based on the hash of the previous challenge block, and a proof-of-space signature based on the proof-of-space. Thus, each challenge block in the challenge chain is also present as a reward block in the reward chain.

In one implementation, a time server can infuse a new challenge block to the challenge chain concurrent with infusion of the corresponding earliest reward block in the reward chain (i.e., before the end of the slot), the time server can then execute the remaining number of VDF iterations in the slot prior to broadcasting the output of this VDF as the subsequent challenge at the end of the slot. Thus, a new challenge is issued exactly once per slot at the beginning of each slot.

In another implementation, a time server does not infuse the new challenge block concurrent with infusion of the corresponding earliest reward block in the reward chain and instead initiates the infused challenge chain based on the earliest reward block of the slot for the remaining duration of the slot. In this implementation, the time server continues to execute the challenge VDF without infusion until the end of the slot. Upon reaching the end of the slot, the time server infuses the infused challenge chain into the challenge chain, thereby generating the proof-of-space challenge of the subsequent block. Thus, in this implementation, the challenge chain can include a reference to the earliest reward block of the prior slot but does not directly infuse this block. This implementation, including the infused challenge chain, is further described below.

7.2 Reward Chain

Generally, the reward chain includes a series of reward blocks that includes the series of challenge blocks (which are the earliest reward blocks within each slot) and a series of reward blocks succeeding the challenge block in each slot of the reward chain. Each reward block in the reward chain includes a proof-of-space responsive to the challenge of the slot, a VDF output characterized by a number of iterations equal to a quality-based number of VDF iterations and based on the hash of a previous reward block, and a signature based on the proof-of-space. Thus, the earliest reward block within a slot is infused into the reward chain and the challenge chain (or the infused challenge chain) and affects the challenge issued during a subsequent slot, while the subset of subsequent reward blocks are infused within the slot to prevent grinding by burying the earliest block beneath additional legitimate blocks, thereby increasing the difficulty of executing a grinding attack on the challenge for the next slot. Therefore, changing the slot challenge of the subsequent slot (in order to provide a competitive advantage in extending the blockchain) forces a malicious node to replace the earliest block in the reward chain thereby orphaning all the blocks that were subsequently infused into the reward chain. This loss cannot be replaced with a minor grinding opportunity on the challenge.

In one implementation, a protocol of the distributed network may distribute a rewards to nodes that successfully generate a reward block that is infused into the reward chain, even if the reward block is not the earliest reward block in response to the most recent slot challenge. Thus, the reward chain can also smooth the distribution of rewards across more nodes in the network (even if these rewards are smaller), thereby decreasing variance in reward distribution.

In another implementation, the protocol of the distributed network can set a target number of reward blocks per slot (e.g., sixteen reward blocks per slot, 32 reward blocks per slot) and adjust a difficulty factor for the proof-of-space algorithm such that the expected number of reward blocks generated by the distributed network equals the target number of reward blocks per slot for each slot of the blockchain.

In yet another implementation, the blockchain structure can include a reward chain with a series of reward chain signage points broadcasted at a predetermined signage point interval by a time server. In this implementation, space servers in the distributed network can receive a reward chain signage point, sign the reward chain signage point, and include, in a new block, the signed reward chain signage point concurrent with the proof-of-space challenge to which the new block is responsive. Alternatively, in this implementation, the space server calculates a proof-of-space challenge based on a slot challenge for a current slot, a challenge chain signage point, and a concurrent reward chain signage point.

7.3 Infused Challenge Chain

In one implementation, shown in FIG. 5, the blockchain includes an infused challenge chain. More specifically, in response to infusion of an earliest reward block of a slot, a time server can: initiate an infused challenge chain VDF based on the earliest reward block of the slot; execute the infused challenge chain VDF for the remaining slot duration; and infuse a terminal value of the infused challenge chain into the challenge chain at the end of the slot. Thus, a time server can delay infusion of this earliest reward block into the challenge chain until the end of the slot. This removes dependency of the challenge chain from reward blocks for the full duration of the slot and enables the execution of an infusion filter for reward blocks included within the reward chain, which is further described below. By maintaining independence between the reward chain and the challenge chain for the full duration of the slot, via the infused challenge chain, the blockchain is more resilient to look-ahead-based grinding attacks.

In particular, the time server can: initiate an infused chain VDF for an infused challenge chain; execute the infused challenge chain VDF for a number of iterations corresponding to a remainder of a current slot duration (e.g., upon infusion of the earliest block of the slot into the reward chain); generate the subsequent slot challenge based on an output (i.e., a terminal output) of the infused challenge chain VDF at the number of iterations corresponding to the remainder of the current slot duration; initiate a subsequent challenge chain VDF for the challenge chain based on the subsequent slot challenge; and initiate a subsequent reward chain VDF for the reward chain based on the subsequent slot challenge.

In one example of this implementation, the infused challenge chain is non-contiguous such that a time server can generate a new infused challenge chain for each slot of the block chain and can terminate the infused challenge chain at the end of each slot. Thus, in this example, from the beginning of the slot until the time server infuses the earliest reward block into the reward chain, the time server does not execute an infused challenge chain VDF.

In another example of this implementation, a time server can infuse the terminal value of the infused challenge chain into both the challenge chain and the reward chain at the end of the slot.

In yet another example of this implementation, a time server can calculate the subsequent slot challenge for the subsequent slot based on a proof-of-space and the challenge chain signage point from a block (e.g., excluding other content of the block). In this example, the time server can initiate the infused challenge chain based on a hash of the proof-of-space and the challenge chain signage point of the block. Thus, in this example, the time server prevents grinding from occurring on the infused challenge chain (via modification or withholding of other content of the block).

7.4 Data Chain

Generally, the data chain includes a series of data blocks, which can represent transaction data and/or cryptographic signatures and hashes corresponding to reward blocks in the reward chain and prior blocks of the data chain. More specifically, upon creating a reward block, a space server can generate a corresponding data block based on a hash of the most recent data block in the data chain and sign this data block with a signature based on the proof-of-space of the reward block. Thus, by including signatures in the reward block, the space servers in the distributed network enforce a one-to-one relationship between data blocks and proofs-of-space generate for new reward blocks, while appending the data blocks in a hash chain ensures that intermediate data blocks cannot be replaced (but blocks at the end of the data chain can). Thus, the data chain can only be rolled back by a number of consecutive data blocks generated by a malicious party. As soon as an honest node adds a data block "burying" earlier data blocks in the data chain, the data chain can no longer be modified. Therefore, nodes in the distributed network can confirm data contained in a data block in response to the data block reaching a selected depth in the data chain.

In one implementation, the distributed network grants a space server that generates the earliest reward block in the reward chain the ability to include transactions (e.g., cryptocurrency transactions) in a corresponding data block of the reward block. Thus, each space server in the network can maintain a running buffer of transactions communicated over the distributed network (i.e., a memory pool or "mempool") and insert these transactions into the data block corresponding to the earliest reward block within the slot. In this implementation, blocks associated with other reward blocks within the reward chain that are not the earliest in their respective slots included hashes or prior data blocks to maintain continuity of the data chain.

In another implementation, any reward block satisfying a specific set of qualifications can be associated with a transaction data block. For example, the space server can generate a transaction data block for any reward block infused to the blockchain that includes a reward chain signage point subsequent to the latest infusion of a block into the reward chain.

7.5 Sub-Epochs, Epochs, and Difficulty Resets

Generally, without some explicit link between the reward chain and the challenge chain, the blockchain may be vulnerable to long range replotting attacks from malicious nodes in the distributed network. This form of attack enables the attacker to, in a first phase, create the challenge chain (independent from the reward chain) in order to observe future challenges and, in a second phase, regenerate plot files within the available space several times, each time infusing the reward chain blocks that can be computed from these challenges until the resulting chain is heavier than the honest one. However, in order to prevent the aforementioned attack, the distributed network can periodically infuse the reward chain into the challenge chain, thereby incorporating the information contained therein into the challenge chain. In this implementation, the distributed network limits the above-mentioned replotting attack to a window between two such infusions, and if this window is shorter than twice the replotting time (as a conservative buffer), the distributed network is not vulnerable to the replotting attack. The period for these infusions of the reward chain into the challenge chain is referred to herein as a sub-epoch and is defined based on number of transpired slots or based on a target number of reward blocks added since the beginning of the current sub-epoch. For example, the distributed network can infuse the reward chain into the challenge chain every 24 slots (e.g., approximately every four hours) or after a 384 reward blocks have been added to the reward chain.

Additionally, in order to control the rate at which reward blocks and/or challenge blocks are added to the reward chain and challenge chain respectively, the distributed network can periodically execute a difficulty reset by modifying: a time parameter that controls the number of VDF iterations within a slot (i.e., the slot length) such that the slot duration is approximately equal to the target slot duration (e.g., ten minutes) and a target signage point interval (e.g., ten seconds); and a space parameter that controls the difficulty of generating a high-quality proof-of-space such that the number of reward blocks added to the reward chain within each slot is approximately equal to a target number of blocks. The period with which the distributed network executes a difficulty reset is referred to herein as an "epoch" and is defined based on a number of slots or reward blocks added since the most recent difficulty reset.

8. Blockchain Selection

Generally, prior to executing the method Sioo or the method S200, a node in the distributed network selects a version of the blockchain that the node can extend (by retrieving proofs-of-space and blocks in the case of a space server or by executing VDFs and infusing blocks in the case of a time server). Due to the asynchronous nature of the distributed network and/or the existence of ongoing attacks, multiple versions of the blockchain may be simultaneously broadcast across the distributed network. Thus, nodes in the distributed network can select a blockchain from among these multiple versions based on a "weight" of the blockchain. A node in the distributed network can calculate a weight based on the length of the blockchain (i.e., the number of blocks represented by the blockchain) and the difficulty parameters for each block in the blockchain. Each node in the distributed network can then select the weightiest chain to which the node has access and can then extend this node according to the method Sioo and/or the method S200.

9. Consensus Algorithm

Figure 3:
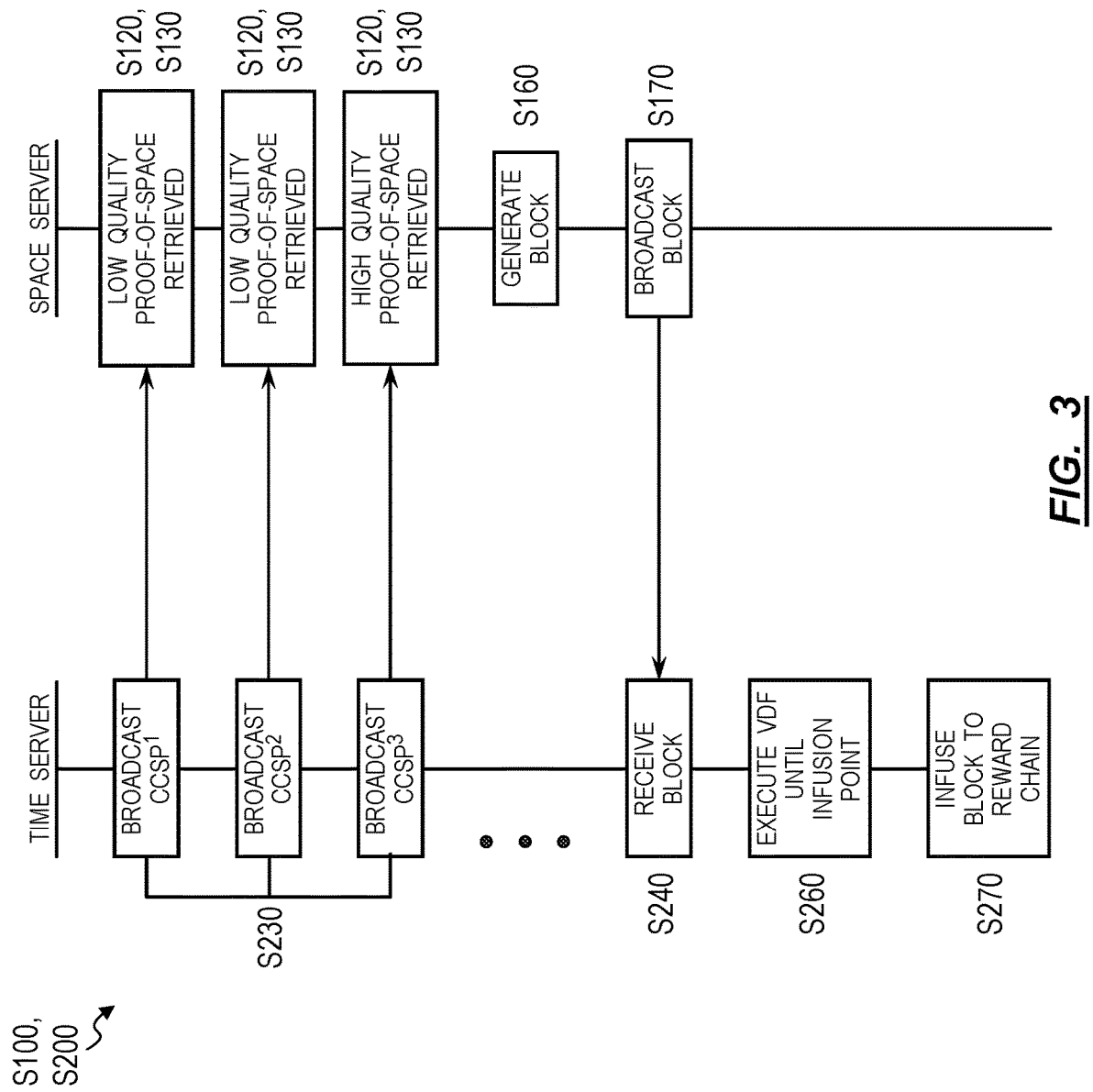
FIG. 3 is a flowchart representation of the first method and the second method.

Generally, as shown in FIG. 3, a space server and a time server in the distributed network execute Steps of the method S100 and Steps of the method S200 respectively in order to reach consensus on infusion of a new reward block into an existing reward chain accessible to both the space server and the time server. Each phase of the consensus algorithm is described in a corresponding section below.

9.1 Challenge Reception

Generally, a space server in the distributed network can receive slot challenges at the beginning of each new slot as each new slot challenge is generated by a time server in the distributed network. More specifically, the space server can access a first proof-of-space challenge based on a current slot challenge associated with the current slot and a first challenge chain signage point in a current series of challenge chain signage points of the current slot in Step S130. In one implementation, the space server can immediately retrieve a proof-of-space based on the slot challenge, as is described below.

Alternatively, the space server can store the current slot challenge in a buffer and await additional information with which the space server can generate a proof-of-space challenge. In this alternative implementation, the space server can periodically receive signage points broadcasted by time servers executing VDFs for the challenge chain and/or the reward chain. The space server can then generate a proof-of-space challenge by hashing the slot challenge and the most recent signage point received via the distributed network (e.g., a challenge chain signage point). More specifically, in this implementation, the space server can: access the current slot challenge and the first challenge chain signage point; calculate a hash of the slot challenge, the first challenge chain signage point, and a plot identifier of the plot file; and calculate the first proof-of-space challenge based on the hash. Thus, the distributed network can periodically update the proof-of-space challenge during a slot in an unpredictable manner, while still maintaining the dependence of each proof-of-space challenge on the slot challenge.

In this implementation, time servers in the distributed network are configured to broadcast a set of discrete signage points at a set of predetermined times within the slot (e.g., periodically on a predetermined number of VDF iterations). In this implementation, the space server can wait until receipt of a latest discrete signage point; sign this signage point; and create a block based on the signed signage point as described below.

In one implementation, the space server can calculate a distinct proof-of-space challenge for each plot file stored on the drive of the space server. In this implementation, the space server can calculate a hash of the slot challenge, the most recent signage point (e.g., a challenge chain signage point and/or a reward chain signage point), and a plot ID of the plot file. Thus, the space server can retrieve a proof-of-space cryptographically associated with the plot from which the proof-of-space was extracted.

In another implementation, the proof-of-space challenge received by the space server is a hash of the VDF output contained in the most recent challenge block. In this implementation, the VDF input received by the time server is a hash of the most recent challenge block.

9.2 Proof-of-Space Generation

Generally, a space server can, in response to accessing a proof-of-space challenge in Step S130: retrieve a proof-of-space based on the proof-of-space challenge and a plot file; execute a quality function on the proof-of-space to calculate a quality of the proof-of-space; and calculate a quality-based number of VDF iterations based on the quality of the proof-of-space. More specifically, the space server can: retrieve a proof-of-space based on the proof-of-space challenge and the plot file, the proof-of-space characterized by a quality in Step S150; and calculate a first quality-based number of iterations based on the first quality in Step S150. Thus, the space server can compare the quality-based number of iterations for the proof-of-space to a threshold number of iterations qualifying the proof-of-space for inclusion in a new block to be infused into the blockchain. In response to the quality-based number of iterations for the proof-of-space exceeding the threshold number of iterations, the space server discards the proof-of-space and awaits access of a subsequent proof-of-space challenge. In response to the quality-based number of iterations not exceeding the threshold number of iterations for the proof-of-space, the space server can proceed to generate a new block for inclusion in the blockchain based on the proof-of-space.

Additionally, the space server can identify, based on the quality-based number of iterations for the proof-of-space, a deadline for infusion of a new block including the proof-of-space into the reward chain. Thus, by implementing a threshold number of iterations for infusion of a new block, the distributed network limits the delay between initial creation of a block and its eventual inclusion in the blockchain.

In one implementation, the threshold number of iterations is equal to the slot length or the remaining slot duration of the current slot. Thus, if the quality-based number of VDF iterations is less than the slot length of the current slot, the space server can identify a time at which to create and broadcast a new reward block to the distributed network for subsequent infusion into the reward chain according to Steps of the method S200. However, if the quality-based number of VDF iterations is greater than the slot length of the blockchain, the space server can discard the proof-of-space and wait until the next challenge to attempt to generate a reward block.

In another implementation, the space server can, in response to the slot length of the blockchain exceeding the quality-based number of VDF iterations, broadcast the proof-of-space over the distributed network for verification by a space server in Step S140. In this implementation, the space server initiates the creation of a new reward block by seeking verification of the proof-of-space by a time server. The time server, upon verifying that the proof-of-space is legitimate, can return a signage point (e.g., a most recent value of the reward chain VDF and/or challenge chain VDF) to the space server to sign and include in the new reward block (as is further described below). Alternatively, the space server can generate a block including a signed signage point and broadcast this partially completed block to a time server via the distributed network. More specifically, the space server can, in response to a slot length of the current slot exceeding the first quality-based number of iterations, generate a new block.

In yet another implementation, the space server can compare the quality-based number of iterations to a threshold number of iterations equal to the signage point interval. More specifically, in this implementation, the space server can, in response to the signage point interval exceeding the quality-based number of iterations, generate a new block; and broadcast the new block to a time server via the distributed network.

9.3 Block Creation

Upon identifying that the quality-based number of iterations corresponding to the retrieved proof-of-space for a given proof-of-space challenge is less than the threshold number of iterations for inclusion in the blockchain, the space server can generate a partial block (lacking a proof-of-time in the form of infusion points, which are generated by a time server executing Steps of the method S200). More specifically, the space server can generate a block including a proof-of-space and a challenge chain signage point in Step S160. Once the space server completes the partial reward block, the space server can then broadcast the new reward block over the distributed network to a time server in Step S170. Thus, the space server can generate a new partial reward block for the reward chain that includes a proof-of-space and is based on the slot challenge and/or recent signage points broadcasted during the slot.

In one implementation, the space server, while generating the new reward block, can generate a corresponding data block, sign this data block based on the proof of space, and append this data block to the data chain. More specifically, the space server can: generate a transaction block comprising a set of transactions from a mempool of the space server and a cryptographic signature based on the partial block. Thus, the space server adds data blocks to the data chain, linked via signature to reward blocks in the reward chain. In one example, in response to creating an earliest reward block in the slot, a space server can include transaction data in the data block corresponding to the earliest reward block, thereby enabling the blockchain to securely store transaction data across a decentralized distributed network.

In another implementation, the space server can cryptographically sign signage points based on the proof-of-space and include these signed signage points in the new block that is broadcast to the network, thereby explicitly relating the proof-of-space to the signage point from which the space server generated the proof-of-space. More specifically, the space server can: cryptographically sign the first challenge chain signage point based on the proof-of-space; and cryptographically sign the first reward chain signage point based on the proof-of-space.

In another implementation, the space server can include a signage point from both the challenge chain and the reward chain in the new block, thereby establishing a cryptographic association between the new block and both chains. More specifically, the space server can generate the new block including the proof-of-space, the challenge chain signage point, and a reward chain signage point in a current series of reward chain signage points of the current slot, the reward chain signage point concurrent with the challenge chain signage point.

In yet another implementation, the space server can include canonical (i.e., predefined) components in a new reward block and can include mutable components, such as transactions and/or other data tracked by the blockchain in a new data block associated with the new reward block. More specifically, the space server can: generate a canonical block including the proof-of-space and the challenge chain signage point; and generate an associated data block including a mutable record (e.g., transactions).

9.4 Proof-of-Time Generation

While space servers in the distributed network respond to the proof-of-space challenge, the time server can receive a VDF input based on the most recent challenge block and/or the slot challenge of a current slot and can initiate execution of one or more VDFs based on the VDF input. More specifically, the time server can, at a beginning of a current slot: initiate a challenge chain VDF for the challenge chain based on a current slot challenge associated with the current slot in Step S220; and initiate a reward chain VDF for the reward chain based on the current slot challenge in Step S222. Thus, a time server in the distributed network functions to establish proofs of the passage of time based on intermediate values of the VDF during a slot.

In one implementation, each time server can execute a challenge chain VDF for the challenge chain and a reward chain VDF for the reward chain. In this implementation, the time server can execute the challenge VDF function in order to establish VDF values that are unaffected by the subsequent infusion of reward blocks during the slot while also enabling infusion of reward blocks into the reward chain VDF. Thus, each time server in the distributed network can execute two VDFs in parallel.

While executing the VDF function, a time server can periodically broadcast, to the distributed network, signage points (sp in FIGS. 4 and 5) for signature and inclusion in new reward blocks by space servers (e.g., in response to verification of a proof-of-space by the time server, or periodically at predetermined intervals within the slot). In applications including a challenge VDF and a reward VDF, a time server can publish signage points for both the challenge VDF and the reward VDF for inclusion in a new reward block by the space server. More specifically, the time server can, on a current signage point interval during the current slot, broadcast a current series of challenge chain signage points by executing the challenge chain VDF and a current series of reward chain signage points by executing the reward chain VDF in Step S230. Thus, by including these signage points in each new block infused into the reward chain, the distributed network ensures that no more than a prespecified interval of time elapsed since a proof-of-space challenge was issued to space servers in the distributed network. Additionally, in applications including an infusion challenge chain, the time server can transmit a third signage point from the infusion chain VDF to the space server for signature and inclusion in a new reward block.

In one implementation, the time server automatically broadcasts signage point VDF outputs at discrete intervals within the slot, and space servers can select a latest signage point prior to the quality-based number of VDF iterations calculated based on the quality of proof-of-space of the new reward block. For example, the time server can automatically broadcast the output of its VDF function 64 times during a slot as 64 different signage points, and the space server can receive and create a block based on the signage point immediately prior to the quality-based number of VDF iterations corresponding to the space server's proof-of-space. Thus, the distributed network can reduce the transmission complexity of the consensus algorithm by enabling space servers to listen for the correct signage point as opposed to requesting it from a time server.

In another implementation, the time server can receive additional proofs-of-space after an earliest proof-of-space within the slot and can issue signage points to the space servers that generated each proof-of-space. However, it is possible that the signage point for the reward block is broadcast to the corresponding space server before the infusion point of the prior reward block. Therefore, in this instance, the space server generating the new reward block does not have access to a finalized version of the previous reward block to hash and include in the new reward block. In this implementation, in applications in which there is overlap between infusion periods of successive reward blocks, the latter of the blocks can skip the earlier block and instead include the hash of the reward block before the earlier block.

While broadcasting signage points from the challenge chain VDF and/or the reward chain VDF during a current slot, the time server can receive a partial block from a space server for infusion into the reward chain. More specifically, the time server can receive, from the distributed network, a block comprising a proof-of-space based on the current slot challenge and a challenge chain signage point in the current series of challenge chain signage points, the proof-of-space characterized by a quality in Step S240. Additionally, the time server can verify whether the proof-of-space is a legitimate response to the proof-of-space challenge and reject the block in response to identifying that the proof-of-space is illegitimate.

In one implementation, upon receiving the new block for infusion into the reward chain, the time server can independently calculate the quality-based number of iterations for the block based on the proof-of-space of the block in order to define the infusion point of the block. More specifically, the time server can calculate a quality-based number of iterations based on the quality of the proof-of-space in the new block in Step S250. Alternatively, the space server can communicate the quality-based number of iterations to the time server in addition the new block.

9.5 Infusion Point Calculation

Generally, the time server can define an infusion point (ip in FIGS. 4 and 5) in the reward chain (i.e., a number of VDF iterations since the beginning of the current slot at which the time server infuses the new reward block into the reward chain) based on the quality-based number of VDF iterations corresponding to the reward block. For example, the time server can define an infusion point at a predetermined number of VDF iterations subsequent to the quality-based number of VDF iterations. Alternatively, the time server can define an infusion point at a proportional number of VDF iterations subsequent to the quality-based number of VDF iterations based on the quality-based number of VDF iterations. In each of the above implementations, the infusion point sets a deadline for the space server to create the block and transmit the signed and complete block to the time server for infusion into the reward chain.

In one example, the time server can set an infusion point for a block at a number of VDF iterations from the beginning of the slot equal to the quality-based number of iterations associated with a proof-of-space of the block. For example, if the quality-based number of VDF iterations for a proof-of-space within a block is 145892 then the time server can set an infusion point for the block 145892 iterations into the current slot. Alternatively, the time server can set an infusion point for a block at a number of VDF iterations from the beginning of the slot equal to the quality-based number of VDF iterations for a proof-of-space plus some constant buffer number of VDF iterations (e.g., 100000 iterations). Thus, by adding a constant number of iterations to the infusion point, the time server ensures a minimum interval of time between creation and infusion of a block.

In another example, the time server can set an infusion point for a block based on the signage point of the block and the quality-based number of iterations of a block. In this example, the time server sets an infusion point that is a quality-based number of iterations after the signage point that initiated the proof-of-space challenge to which the block is responsive. Thus, the time server establishes a maximum interval between creation of a block based on a signage point broadcast by the time server and infusion of that block. For example, the time server can set an infusion point of a block equal to the number of iterations of the signage point of the block plus the quality-based number of iterations of the block plus a constant number of iterations.

In yet another example, the time server can calculate the number of infusion iterations (between issuing the signage point and the infusion point of a reward block) based on the quality-based number of iterations corresponding to the proof-of-space of the new reward block. For example, the time server can calculate a number of infusion VDF iterations as a proportion (e.g., 10%) of the initial number of VDF iterations.

9.6 Block Infusion

After receiving the new reward block in Step S240, the time server can: continue executing the VDF function until the infusion point defined for the new block and infuse the block at the defined infusion point. More specifically, the time server can execute the reward chain VDF for a number of infusion iterations based on the quality-based number of iterations in Step S260. Thus, the space server and the time server can mutually verify the proof-of-time and the proof-of-space, respectively, over the distributed network. The space server then creates a new reward block including both proofs, and the time server can infuse this new block into the reward chain.

Upon executing the number of infusion iterations corresponding to the infusion point of the new block, the time server can append the infusion point to the new block, thereby completing the block in preparation for immediate infusion of the block. More specifically, the time server can, in response to executing the reward chain VDF for the number of infusion iterations, append a reward chain infusion point to the first block, the first reward chain infusion point based on the output of the reward chain VDF at the number of infusion iterations in Step S27o. The time server generates an infusion point by iterating a VDF for the number of infusion iterations, therefore, the output of the VDF after the number of infusion iterations is the infusion point, which can then be appended to the new block.

Upon appending the reward chain infusion point to the new block, the time server can then infuse the new block back into the reward chain. More specifically, the time server can infuse the block into the reward chain VDF to extend the blockchain in Step S280. Thus, future iterations of the reward chain VDF are dependent upon both an immediately prior iteration of the reward chain VDF and the content of the new block.

Generally, the time server appends a reward chain infusion point into a new block. However, in some implementations, the time server can also append concurrent infusion points from parallel chains such as a challenge chain infusion point (in FIG. 5: cc ip1, cc ip2, cc ip3, etc.) and an infused challenge chain infusion point. More specifically, the time server can, in response to executing the challenge chain VDF for the first number of infusion iterations, append a challenge chain infusion point to the block, the challenge chain infusion point based on the output of the challenge chain VDF at the number of infusion iterations. Likewise, to append the infused challenge chain infusion point, the time server can, in response to executing the infused challenge chain VDF for the first number of infusion iterations, append an infused challenge chain infusion point to the block, the infused challenge chain infusion point based on the output of the infused challenge chain VDF concurrent with the reward chain infusion point and/or the challenge chain signage point.

In one implementation, in response to identifying that the block is characterized by the earliest infusion point among all blocks generated during the current slot, the time server can infuse the new block into the challenge chain concurrent with the infusion of the new block into the reward chain. More specifically, the time server can, in response to the block being an earliest block infused into the reward chain during the current slot, calculate a subsequent slot challenge for a subsequent slot to the current slot based on the first block. Thus, in this implementation, the earliest reward block to be infused into the reward chain for a given slot is simultaneously infused into the challenge chain. In this implementation, one consequence of utilizing two separate VDF function threads (i.e., one for the challenge chain and one for the reward chain) is that, in order to efficiently progress the blockchain as a whole, time servers can execute two VDF functions concurrently.

Figure 6:
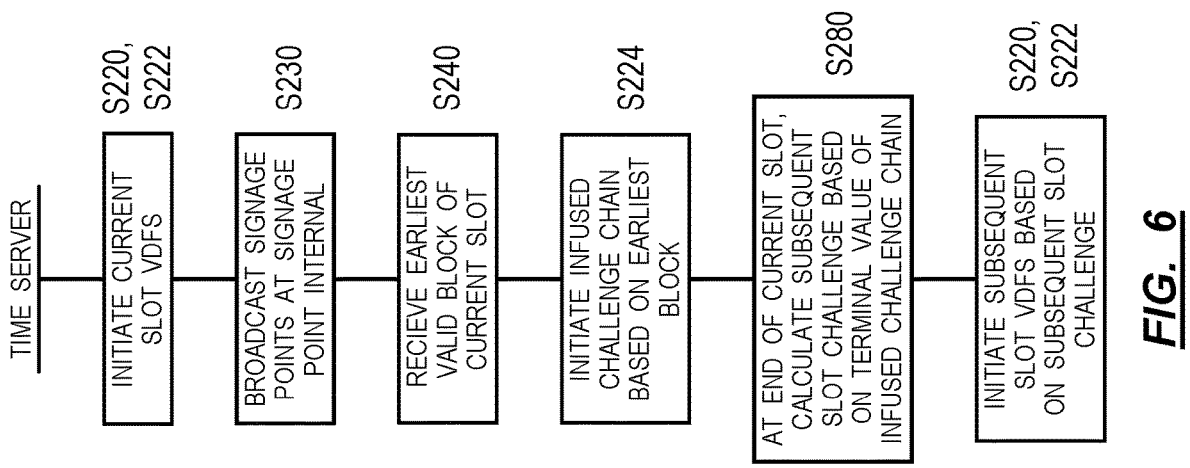
FIG. 6 is a flowchart representation of one variation of the second method.

In another implementation, shown in FIG. 6, the time server can wait until the end of the slot before infusing the earliest reward block into the challenge chain. In this implementation, the time server can initiate an infusion challenge chain VDF based on the earliest reward block of the slot and can continue executing this infusion challenge VDF until the end of the slot. The time server can then combine the infusion challenge VDF with the challenge VDF in order to incorporate the content of the earliest reward block into the challenge of the subsequent block. Additionally, the time server can, at the end of the slot, combine the infusion challenge chain with the reward chain VDF, thereby affecting the slot challenge for the subsequent slot based on the earliest reward block of the prior slot.

9.7 Filters

In one implementation, the time server can execute an infusion filter or signage-point filter that dictates whether the time server can infuse a newly-created reward block into the reward chain. In this implementation, the time server can execute the infusion filter on a block prior to infusing the block into the reward chain; the infusion filter then generates a binary output indicating whether the new reward block passes or fails the infusion filter. Thus, by executing the infusion filter, time servers provide an additional layer of unpredictability regarding which reward blocks will be infused in the reward chain in a given slot. This unpredictability increases the blockchain's resistance to grinding attacks by increasing the potential branches of the blockchain that must be explored by a malicious actor in order to identify the challenge of a subsequent block and then exploit this information, thereby discouraging this type of attack.

In one example, the time server can execute the infusion filter on a block based on the challenge signage point of the block. In this example, the time server can receive a new reward block for infusion into the reward chain; access the challenge signage point included in the reward block; and evaluate whether the challenge signage point satisfies a condition that occurs with a predetermined frequency (e.g., a threshold number of initial digits of the signage point are equal to zero). By limiting infusion in the reward chain based on challenge signage points from the challenge chain, a time server can prevent attacks that seek to modify the probability of inclusion later in the block by withholding or delaying an earlier generated block. Additionally, in this example, the blockchain can include an infusion challenge chain that functions to delay infusion of the earliest reward block into the challenge chain until the end of the slot. Thus, in this example, signage points from the reward chain are not affected by infusion of the earliest reward block into the challenge chain before the end of the slot (which would then change the values of all subsequent challenge signage points during the slot).

In another implementation, the space server can execute a filter at the plot-file-level to disqualify a certain number of plot files when generating a proof-of-space, thereby reducing network traffic relative to the infusion filter described above. In this implementation, the space server can, for each plot file stored by the space server, calculate a filter hash based on the current slot challenge, the challenge chain signage point, and a plot ID. The space server can then apply a plot filter criterion (e.g., that plots are included only if the first eight digits of the filter hash of the plots are equal to zero) to eliminate plots from which the space server can retrieve proofs-of-space. More specifically, the space server can: calculate a filter hash of the current slot challenge, the challenge chain signage point, and a plot identifier of the plot file; and, in response to accessing the proof-of-space challenge and in response to the filter hash satisfying a plot filter criterion, retrieve the proof-of-space based on the proof-of-space challenge and the plot file. Thus, by implementing a plot filter, the distributed network can randomly eliminate a predetermined proportion of plot files (based on the plot filter criterion) from competing for high-quality proofs-of-space, thereby reducing the effectiveness of withholding attacks.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for extending a blockchain comprises, at a space server in a distributed network:
storing a plot file;
accessing a blockchain, the blockchain, defining a series of slots, each slot in the series of slots:
associated with a slot challenge;
comprising a challenge chain:
based on the slot challenge; and
comprising a series of challenge chain signage points; and
comprising a reward chain:
based on the slot challenge;
comprising a series of reward chain signage points; and
comprising a series of blocks, each block in the series of blocks responsive to a proof-of-space challenge based on the slot challenge, a challenge chain signage point, and a reward chain signage point;
during a current slot in the series of slots, accessing a first proof-of-space challenge based on a current slot challenge associated with the current slot and a first challenge chain signage point in a current series of challenge chain signage points of the current slot;
in response to accessing the first proof-of-space challenge, retrieving a first proof-of-space based on the first proof-of-space challenge and the plot file, the first proof-of-space characterized by a first quality;
calculating a first quality-based number of iterations based on the first quality;
in response to a threshold number of iterations exceeding the first quality-based number of iterations, generating a first block comprising the first proof-of-space, the first challenge chain signage point, and a first reward chain signage point in a current series of reward chain signage points of the current slot, the first reward chain signage point concurrent with the first challenge chain signage point; and
broadcasting the first block to the distributed network.

2. The method of claim 1, wherein retrieving the first proof-of-space based on the first proof-of-space challenge and the plot file comprises:
calculating a filter hash of the current slot challenge, the first challenge chain signage point, and a plot identifier of the plot file; and
in response to accessing the first proof-of-space challenge and in response to the filter hash satisfying a plot filter criterion, retrieving the first proof-of-space based on the first proof-of-space challenge and the plot file.

3. The method of claim 1, wherein accessing the first proof-of-space challenge comprises:
accessing the current slot challenge and the first challenge chain signage point;
calculating a hash of the slot challenge, the first challenge chain signage point, and a plot identifier of the plot file; and
calculating the first proof-of-space challenge based on the hash.

4. The method of claim 1, further comprising:
during the current slot, accessing a second proof-of-space challenge based on the current slot challenge and a second challenge chain signage point in the current slot;
in response to accessing the second proof-of-space challenge, retrieving a second proof-of-space based on the second proof-of-space challenge and the plot file, the second proof-of-space characterized by a second quality;
calculating a second quality-based number of iterations based on the second quality; and
in response to the second quality-based number of iterations exceeding the threshold number of iterations, ceasing creation of a first block comprising the second proof-of-space, the second challenge chain signage point, and the second reward chain signage point.

5. The method of claim 1, wherein, in response to the threshold number of iterations exceeding the first quality-based number of iterations, generating the first block comprises, in response to a slot length of the current slot exceeding the first quality-based number of iterations, generating the first block.

6. The method of claim 1, wherein, in response to the threshold number of iterations exceeding the first quality-based number of iterations, generating the first block comprises, in response to a signage point interval of the current slot exceeding the first quality-based number of iterations, generating the first block, the signage point interval defining a number of iterations between the current series of challenge chain signage points and between the current series of reward chain signage points.

7. The method of claim 1, further comprising:
cryptographically signing the first challenge chain signage point based on the proof-of-space; and
cryptographically signing the first reward chain signage point based on the proof-of-space.

8. The method of claim 1, wherein generating the first block comprises generating the first block comprising the first proof-of-space, the first challenge chain signage point, and the first reward chain signage point in a current series of reward chain signage points of the current slot, the first reward chain signage point concurrent with the first challenge chain signage point.

9. The method of claim 1, wherein generating the first block comprises generating a first canonical block comprising the first proof-of-space and the first challenge chain signage point.

10. A method for extending a blockchain over a network comprises, at a space server in a distributed network:
accessing a blockchain, the blockchain defining a series of slots, each slot in the series of slots:
associated with a slot challenge;
comprising a challenge chain:
based on the slot challenge; and
comprising a series of challenge chain signage points;
comprising a reward chain:
based on the slot challenge; and
comprising a series of reward chain signage points; and
comprising a series of blocks, each block in the series of blocks responsive to a proof-of-space challenge based on the slot challenge, a challenge chain signage point, and a reward chain signage point;
at a beginning of a current slot:
initiating a challenge chain verifiable delay function for the challenge chain based on a current slot challenge associated with the current slot; and
initiating a reward chain verifiable delay function for the reward chain based on the current slot challenge;
on a current signage point interval during the current slot, broadcasting a current series of challenge chain signage points by executing the challenge chain verifiable delay function and a current series of reward chain signage points by executing the reward chain verifiable delay function;
receiving, from the distributed network, a first block comprising a first proof-of-space based on the current slot challenge and a first challenge chain signage point in the current series of challenge chain signage points, the proof-of-space characterized by a first quality;
calculating a first quality-based number of iterations based on the first quality;
executing the reward chain verifiable delay function for a first number of infusion iterations based on the first quality-based number of iterations; and
in response to executing the reward chain verifiable delay function for the first number of infusion iterations:
app ending a first reward chain infusion point to the first block, the first reward chain infusion point based on an output of the reward chain verifiable delay function at the first number of infusion iterations; and
infusing the first block into the reward chain verifiable delay function to extend the blockchain.

11. The method of claim 10, further comprising, in response to the first block being an earliest block infused into the reward chain during the current slot, calculating a subsequent slot challenge for a subsequent slot to the current slot based on the first block.

12. The method of claim 11, wherein calculating the subsequent slot challenge for a subsequent slot to the current slot based on the first block comprises:
initiating an infused chain verifiable delay function for an infused challenge chain;
executing the infused challenge chain verifiable delay function for a number of iterations corresponding to a remainder of a current slot duration;
generating the subsequent slot challenge based on an output of the infused challenge chain verifiable delay function at the number of iterations corresponding to the remainder of the current slot duration;
initiating a subsequent challenge chain verifiable delay function for the challenge chain based on the subsequent slot challenge; and
initiating a subsequent reward chain verifiable delay function for the reward chain based on the subsequent slot challenge.

13. The method of claim 12, further comprising, on a subsequent signage point interval during the subsequent slot, broadcasting a subsequent series of challenge chain signage points by executing the subsequent challenge chain verifiable delay function and a subsequent series of reward chain signage points by executing the subsequent reward chain verifiable delay function, wherein the subsequent signage point interval is greater than the current signage point interval and corresponds to a target signage point time interval at a time server.

14. The method of claim 12, further comprising, in response to executing the reward chain verifiable delay function for the first number of infusion iterations, appending a first infused challenge chain infusion point to the first block, the first infused challenge chain infusion point based on an output of the infused challenge chain verifiable delay function concurrent with the first reward chain infusion point.

15. The method of claim 11, wherein calculating the subsequent slot challenge for the subsequent slot to the current slot based on the first block comprises calculating the subsequent slot challenge for the subsequent slot based on the first proof-of-space and the first challenge chain signage point.

16. The method of claim 10, wherein receiving the first block comprises receiving, from the distributed network, the first block comprising the first proof-of-space, the first challenge chain signage point, and a first reward chain signage point in the current series of reward chain signage points, the first reward chain signage point concurrent with the first challenge chain signage point.

17. The method of claim 10, wherein receiving the first block comprises receiving, from the distributed network, the first block comprising:
- the first proof-of-space based on the current slot challenge; and
- the first challenge chain signage point cryptographically signed based on the first proof-of-space.

18. The method of claim 10, further comprising, in response to executing the challenge chain verifiable delay function for the first number of infusion iterations, appending a first challenge chain infusion point to the first block, the first challenge chain infusion point based on an output of the challenge chain verifiable delay function at the first number of infusion iterations.

19. The method of claim 10, further comprising:
- receiving, from the distributed network, a second block comprising a second proof-of-space based on the current slot challenge and a second challenge chain signage point in the current series of challenge chain signage points, the proof-of-space characterized by a second quality;
- calculating a second quality-based number of iterations based on the second quality;
- executing the reward chain verifiable delay function for a second number of infusion iterations based on the second quality-based number of iterations; and
- in response to executing the reward chain verifiable delay function for the second number of infusion iterations:
  - appending a second reward chain infusion point to the second block, the second reward chain infusion point based on an output of the reward chain verifiable delay function at the second number of infusion iterations; and
  - infusing the second block into the reward chain verifiable delay function to extend the blockchain.

20. The method of claim 10, wherein infusing the first block into the reward chain verifiable delay function to extend the blockchain comprises modifying a class group of the reward chain verifiable delay function based on a hash of the first block.

* * * * *